US008036114B2

(12) United States Patent
Magill et al.

(10) Patent No.: US 8,036,114 B2
(45) Date of Patent: Oct. 11, 2011

(54) BI-DIRECTIONAL RING NETWORK HAVING MINIMUM SPARE BANDWIDTH ALLOCATION AND CORRESPONDING CONNECTION ADMISSION CONTROL

(75) Inventors: Robert B. Magill, South Bend, IN (US); Philip J. Lin, Newton, MA (US)

(73) Assignee: Tellabs Operations, Inc., Naperville, IL (US)

( * ) Notice: Subject to any disclaimer, the term of this patent is extended or adjusted under 35 U.S.C. 154(b) by 34 days.

(21) Appl. No.: 12/039,397

(22) Filed: Feb. 28, 2008

(65) Prior Publication Data

US 2008/0159735 A1 Jul. 3, 2008

Related U.S. Application Data

(62) Division of application No. 10/601,429, filed on Jun. 23, 2003, now Pat. No. 7,359,323, which is a division of application No. 09/322,337, filed on May 28, 1999, now Pat. No. 6,606,297.

(60) Provisional application No. 60/087,264, filed on May 29, 1998.

(51) Int. Cl.
*G01R 31/08* (2006.01)

(52) U.S. Cl. ........ 370/230; 370/222; 370/254; 370/216; 370/468

(58) Field of Classification Search .................. None
See application file for complete search history.

(56) References Cited

U.S. PATENT DOCUMENTS

| | | | |
|---|---|---|---|
| 4,956,835 A | 9/1990 | Grover | |
| 5,088,091 A | 2/1992 | Schroeder et al. | |
| 5,138,615 A | 8/1992 | Lamport et al. | |
| 5,179,548 A | 1/1993 | Sandesara | |
| 5,327,427 A * | 7/1994 | Sandesara | ..... 370/222 |
| 5,515,367 A | 5/1996 | Cox, Jr. et al. | |
| 5,687,167 A * | 11/1997 | Bertin et al. | ..... 370/254 |
| 5,787,271 A | 7/1998 | Box et al. | |
| 6,011,780 A | 1/2000 | Vaman et al. | |
| 6,026,073 A | 2/2000 | Brown et al. | |
| 6,044,075 A | 3/2000 | Le Boudec et al. | |
| 6,097,696 A | 8/2000 | Doverspike | |
| 6,111,672 A | 8/2000 | Davis et al. | |
| 6,209,033 B1 | 3/2001 | Datta et al. | |

(Continued)

OTHER PUBLICATIONS

L. Wuttisittikulkij and M.J. O'Mahony, Use of Spare Wavelenghts for Traffic Restoration in Multi-Wavelength Transportation Network, IEEE 1996, pp. 1778-1782.

(Continued)

*Primary Examiner* — Duc C Ho
(74) *Attorney, Agent, or Firm* — Husch Blackwell LLP.

(57) ABSTRACT

The present invention provides for a method for reserving spare bandwidth for a link in a communication network including a plurality of links. The method provides for monitoring the volume of traffic routed through each link of the communication network. A single link failure for each link is then simulated and the volume of traffic which would be rerouted through each link for maintaining communication and the volume of traffic removed from each link are determined for each simulated single link failure. The difference between the volume of traffic which would need to be rerouted through each link and the corresponding volume of traffic removed from each link is then computed, and a maximum difference value is determined for each link for all simulated single link failures. An amount of spare bandwidth equivalent to the determined maximum difference is then reserved for each link.

13 Claims, 7 Drawing Sheets

U.S. PATENT DOCUMENTS

| | | | |
|---|---|---|---|
| 6,215,763 | B1 | 4/2001 | Doshi et al. |
| 6,324,162 | B1 | 11/2001 | Chaudhuri |
| 6,421,349 | B1 | 7/2002 | Grover |
| 6,498,778 | B1 | 12/2002 | Cwilich et al. |
| 6,606,297 | B1 | 8/2003 | Magill et al. |
| 6,606,667 | B1 | 8/2003 | Hermann |
| 6,616,350 | B1 | 9/2003 | de Boer et al. |
| 6,654,379 | B1 | 11/2003 | Grover et al. |
| 6,658,457 | B2 | 12/2003 | Nishikawa et al. |
| 6,675,229 | B1 | 1/2004 | Bruno et al. |
| 6,728,205 | B1 | 4/2004 | Finn et al. |
| 6,744,727 | B2 | 6/2004 | Liu et al. |
| 6,763,190 | B2 | 7/2004 | Agrawal et al. |
| 6,848,006 | B1 | 1/2005 | Hermann |
| 6,856,592 | B2 | 2/2005 | Grover et al. |
| 6,996,514 | B2 | 2/2006 | Gruber |
| 7,075,927 | B2 | 7/2006 | Mo et al. |
| 7,308,198 | B1 | 12/2007 | Chudak et al. |
| 7,359,323 | B2 | 4/2008 | Magill et al. |
| 7,424,035 | B2 | 9/2008 | Saleh et al. |
| 2001/0038471 | A1 | 11/2001 | Agrawal et al. |
| 2001/0048660 | A1 | 12/2001 | Saleh et al. |
| 2002/0071392 | A1 | 6/2002 | Grover et al. |
| 2002/0075869 | A1 | 6/2002 | Shah et al. |
| 2002/0163682 | A1 | 11/2002 | Su et al. |
| 2002/0191244 | A1 | 12/2002 | Antosik et al. |
| 2002/0194339 | A1 | 12/2002 | Lin et al. |
| 2003/0065811 | A1 | 4/2003 | Lin et al. |
| 2004/0186701 | A1 | 9/2004 | Aubin et al. |

OTHER PUBLICATIONS

J.W. Suurballe and R.E. Tarjan, A Quick Method for Finding Shortest Pairs of Disjoint Paths, Networks, vol. 14 (1984) pp. 325-336, © 1984 John Wiley & Sons, Inc.

R.R. Iraschko, M.H. MacGregor, and W.D. Grover, Optimal Capacity Placement for Path Restoration in Mesh Survivable Networks, © 1996 IEEE, pp. 1568-1574.

B.D. Venables, W.D. Grover, and M.H. MacGregor, Two Strategies for Spare Capacity Placement in Mesh Restorable Networks, © 1993 IEEE, pp. 267-271.

W.D. Grover, T.D. Bllodeau, and B.D. Venables, Near Optimal Spare Capacity Planning in a Mesh Restorable Network, Globecom '91, © 1991 IEEE, pp. 2007-2012.

W.D. Grover, Mesh-Based Survivable Networks, Prentice Hall, pp. 293-310.

R.B. Magill, A Brandwidth Efficient Self-Healing Ring for B-ISDN.

R.B. Magill and P.J. Lin, Reducing Spare Bandwidth Requirements in Self-Healing Rings.

D. Mills, Self-Healing Ring Architectures for SONET Network Applications, May 28, 1998.

* cited by examiner

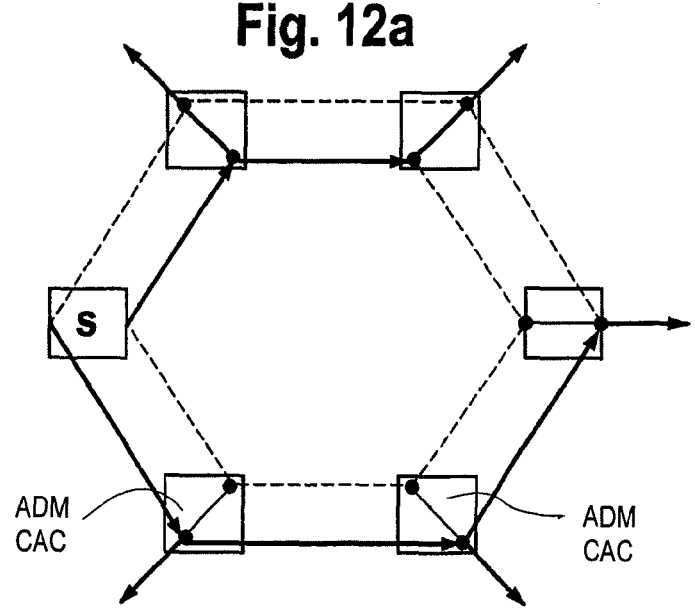
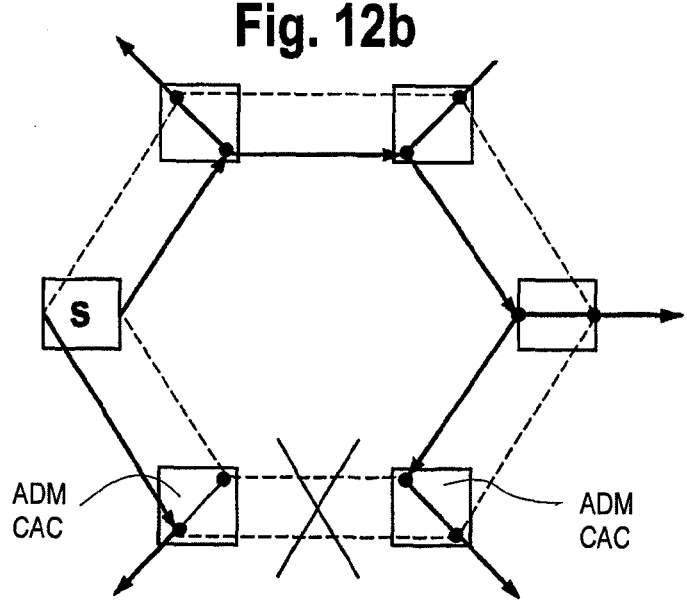

BI-DIRECTIONAL RING NETWORK HAVING MINIMUM SPARE BANDWIDTH ALLOCATION AND CORRESPONDING CONNECTION ADMISSION CONTROL

CROSS-REFERENCE TO RELATED APPLICATIONS

This application is a divisional application of U.S. Ser. No. 10/601,429 filed Jun. 23, 2003 now U.S. Pat. No. 7,359,323, now allowed, which is a divisional application of application Ser. No. 09/322,337 filed May 28, 1999, now U.S. Pat. No. 6,606,297, which claims the benefit of the filing date of Provisional Patent Application No. 60/087,264 filed May 29, 1998 and entitled "Bi-Directional Ring Network Having Minimum Spare Bandwidth Allocation and Corresponding Connection Admission Control".

STATEMENT REGARDING FEDERALLY SPONSORED RESEARCH OR DEVELOPMENT

Not Applicable

BACKGROUND OF THE INVENTION

Communications networks, such as B-ISDN networks, may support large volumes of traffic and offer a wide variety of services. The ever increasing traffic loads and the growing reliance on the telecommunications infrastructure for both business and personal communication necessitate reliable networks. In connection oriented networks, fast connection restoration after failure is a crucial element of reliability. Self-healing methods, which automatically restore network connections after failure, exist for general network architectures and for ring networks. These methods typically rely on distributed control to insure fast fault recovery and to protect against catastrophic failure.

Self-Healing Rings (SHRs) have proven to be an effective architecture for delivering protected SONET service. This architecture consists of 2- or 4-fiber rings which give the ability to carry traffic in both the clockwise and the counter-clockwise direction. When a failure occurs in the ring, traffic is switched away from the failed ring segment. SHRs offer fast restoration after failure, 100% traffic recovery from single location failures and a simple add/drop multiplexer architecture for network access. SHRs rely on a type of self-healing called protection switching where a failed connection is automatically switched to a pre-established back-up connection. End-to-end path protection switching is used in SONET Dual-Fed Unidirectional Path Switched Rings (UPSRs). Bidirectional Line Switched Rings (BLSRs) use point-to-point line protection switching. In addition to SONET transport, SHRs are proposed for other connection oriented networks such as all-optical wavelength division multiplexed (WDM) networks and ATM LANs. The protection switching mechanisms developed for SONET SHRs are being adapted to other networks and network layers. For example, ATM layer protection schemes are proposed for SONET Rings carrying ATM traffic and for ATM LANs.

Self-healing protocols usually involve four steps: spare capacity allocation, failure detection, failure notification and protection switching. One of the critical issue's in determining the feasibility of a SHR protection mechanism is the required capacity needed to provide 100% restoration after single location failures. The ring capacity requirement depends on the spare bandwidth allocation, the traffic demand pattern, the protection scheme and the routing method. Traditionally, SONET connections are bidirectional and symmetric; in other words, a SONET link between two points in the network contains the same bandwidth allocation in both directions. Standards are being developed which allow SONET connections to be unidirectional or bidirectional asymmetric. Asymmetric connections contain different bandwidth allocations for each direction of a duplex path. Since asymmetric connections are possible in ATM as well, the traffic demand patterns in future SHRs may contain asymmetric demand between node pairs.

Three distinct methods of protection switching have been identified for ring networks. They are referred to here as 1:1 path switching, 1+1 path switching, and 1:1 line switching. FIG. 1a illustrates 1+1 path switching. The ring on the right demonstrates a protection switch. This method duplicates traffic entering the ring and dual-feeds it along both a working path and a protection path. The destination node chooses a path based on path status information. In SONET, a path is an STS or a VT. In ATM, a path can be a VP group, a VP or a VC.

FIG. 1b illustrates 1:1 path switching wherein the dotted line represents the protection path. The source node transmits traffic along the working path only. When a fault is detected in the ring, failure messages are propagated to the source nodes of all affected paths. The source nodes switch the working paths to the protection paths traveling the opposite direction around the ring.

The third method, 1:1 line switching, does not switch traffic on an individual path basis; rather, the node upstream of the failure reroutes all traffic in a bundled fashion away from the failure. FIG. 1c illustrates one embodiment of a switching method where the destination nodes receive connections from either link. This method, commonly referred to as Kajiyama's line method, uses only one loopback for switched traffic. The line switching mechanism in SONET rings results in a double loopback because a particular connection can only be received from one link.

These protection methods work for unidirectional or bidirectional rings. In a unidirectional ring all working traffic travels the same direction around the ring, and all protection traffic travels the opposite direction. Thus, working traffic is dedicated to one fiber, and two paths of a duplex connection contain a disjoint set of intermediate nodes. In bidirectional rings, working traffic may be assigned to fibers in both directions. In general, each direction of a duplex connection traverses the same ring nodes but on different fibers.

It is possible to develop expressions for the required capacity for the ring size needed to support a particular traffic demand. In developing such expressions, all links on all fibers of a ring are assumed to have the same link rate; e.g., OC-12, etc. The size of the ring, or, similarly, the amount of traffic that can be placed on the ring, is determined by the required capacity for a particular set of connections. The required capacity is given by the maximum of the minimum bandwidth needed on any link to support a particular traffic pattern under a non-failure or any single location failure scenario. The bandwidth of this link, the maximum bandwidth link, gives the required capacity or minimum ring size needed to fully protect the traffic. The required capacity depends upon the traffic demand pattern, the protection scheme, the routing method and the spare capacity allocation method.

As mentioned above, the ring may be unidirectional or bidirectional. The ring type, which is determined by the routing method, impacts the required capacity. Another factor which impacts the required capacity is whether the demand between node pairs is symmetric or asymmetric. An analysis for the required capacity for the three protection schemes on unidirectional and bidirectional rings with symmetric and asymmetric demand.

In 1+1 path switching there is no routing choice since both paths from source to destination are active. The 1+1 path switching scheme is considered a unidirectional ring. (Typically, the default working paths are designated to one particular fiber.) The working paths may be assigned in a bidirectional sense where the working paths of a duplex connection traverse the same nodes but on opposite ring fibers; however, this distinction between working and protection paths does not affect the required capacity. For symmetric duplex connections, the dual-fed property of this protection scheme causes one direction of the demand between node pairs to be present on each link of the ring. Thus, if $d(i, j)$ represents the one-way demand bandwidth between node pairs i and j, the required capacity, RC, is given by:

$$RC = \sum_{one\ way} d(i, j) \quad (1)$$

For asymmetric connections, the bandwidth demand on each link may vary. The ring capacity is given by the link with the maximum bandwidth. A simple analysis of the 1+1 path switched ring indicates that simplex demand combinations on one fiber may require more bandwidth than combinations on the other fiber. This is illustrated in FIG. 2. The thin line represents a connection requiring d bandwidth. The thick line represents a connection requiring d+m bandwidth. Although the extra bandwidth m is available between nodes 1 and 4 on the outer fiber, using this bandwidth for a connection other than between nodes 1 and 4 results in an overlap on the inner fiber of the new connection with the d+m connection. The dotted line in FIG. 2 represents the new connection. The required capacity is d+2m as defined by the inner links between nodes 2 and 4.

The 1:1 protection methods are suitable for both unidirectional and bidirectional rings. Because these methods have only one active path between the source and destination, a routing choice exists for each connection. In 1:1 path and 1:1 line switching in a unidirectional ring, the working fiber contains the same topology as the working fiber in 1+1 path switching. The only difference is that the protection fiber contains no traffic; it contains only the traffic from the failed span after the protection switch. (This difference may be significant because the bandwidth is available for use by a non-protected class of traffic.) Thus, for symmetric connections on a unidirectional ring, the required capacity for the 1:1 protection schemes is given by equation (1) above.

For asymmetric connections, however, a bandwidth advantage may exist for the 1:1 protection methods over 1+1 path switching. As shown in FIG. 2, the outer (working) fiber needs d+m bandwidth to support the connections. This working fiber determines the required capacity for 1:1 protection, whereas 1+1 path switching requires d+2m capacity on the inner fiber. Thus, on average, the 1:1 protection methods in unidirectional rings require equal or less capacity than 1+1 path protection for all demand patterns.

Bidirectional rings, such as SONET rings, may contain either 2 or 4 fibers. Four-fiber rings reserve a fiber in each direction for protection traffic. Two-fiber bidirectional rings reserve a portion of the bandwidth on each fiber for protection traffic. Existing 2-fiber rings reserve 50% of the bandwidth on each link for protection traffic. This spare bandwidth allocation factors into the ring capacity calculation. The link containing the maximum working traffic bandwidth for a given demand pattern is used as the maximum bandwidth link. The ring capacity is given by twice this bandwidth. The ring capacity for any demand pattern is the same for 1:1 path switching and 1:1 line switching even though the two methods produce different protection paths for the same working traffic. The working traffic alone determines the ring capacity because there is always enough spare bandwidth to reroute the maximum bandwidth link's working traffic.

The present inventors have recognized that each bidirectional ring with 1:1 path protection may be designed using minimum spare bandwidth allocation methods to produce the smallest ring capacity requirement for any traffic demand pattern. Such minimum spare bandwidth methods may be adapted for use in a connection admission controlled method for minimum spare bandwidth allocation. To this end, the present inventors have examined the required ring size for three self-healing mechanisms under symmetric and asymmetric demand and different routing schemes. They have shown that asymmetric connections adversely affect 1+1 path switching when compared to 1:1 protection switching on unidirectional rings. This in turn allows the 1:1 methods to require a smaller unidirectional ring size. Similarly, their analysis of past bandwidth allocation methods on bidirectional rings which reserve 50% of the total bandwidth on each span for protection traffic show that the relative capacity of the protection methods are dependent on the demand pattern. The proposed minimum spare bandwidth assignments for the 1:1 protection methods, however, decrease the required capacity of bidirectional rings for both symmetric and asymmetric traffic. This optimal partitioning of working and protection bandwidth makes a bidirectional ring with 1:1 path switching the most bandwidth efficient method for all demand patterns.

BRIEF SUMMARY OF THE INVENTION

The present invention provides for a method for reserving spare bandwidth for a link in a communication network including a plurality of links. The method provides for monitoring the volume of traffic routed through each link of the communication network. A single link failure for each link is then simulated and the volume of traffic which would be rerouted through each link for maintaining communication and the volume of traffic removed from each link are determined for each simulated single link failure. The difference between the volume of traffic which would need to be rerouted through each link and the corresponding volume of traffic removed from each link is then computed, and a maximum difference value is determined for each link for all simulated single link failures. An amount of spare bandwidth equivalent to the determined maximum difference is then reserved for each link.

In an alternative embodiment a connection admission control method for use in a communication network is provided. The method provides for the receipt of a request for a communication connection. The bandwidth needed for the requested communication and the maximum additional spare bandwidth needed is determined and the sum of the two is compared to the available bandwidth for each of the links. If sufficient bandwidth for each of the links is available, the communication request is accepted.

BRIEF DESCRIPTION OF THE SEVERAL VIEWS OF THE DRAWINGS

FIG. 12 illustrates an example of point-to-multipoint communication via a self healing ring network topology.

DETAILED DESCRIPTION OF THE INVENTION

Figure 3:
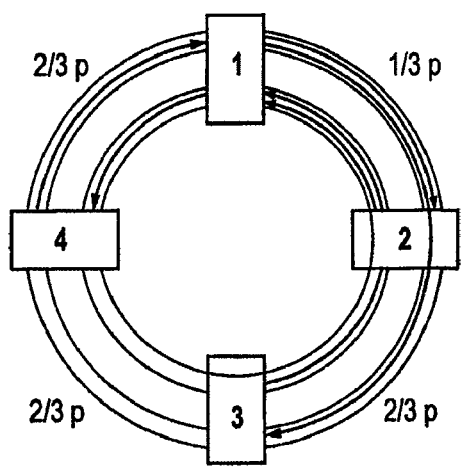
FIG. 3 illustrates bandwidth assignments in a 1:1 protection ring.

With the appropriate bandwidth granularity, it is possible to allocate spare bandwidth only as needed on each link of a bidirectional ring rather than reserving 50% of the bandwidth on each span for protection traffic. An optimal spare bandwidth allocation reserves the minimum bandwidth needed on each link such that the worst case failure is supported. This allocation, in turn, means the required capacity is given by the link with the maximum bandwidth after any failure or non-failure scenario. The maximum bandwidth link is now defined by both the working and protection traffic. The worst case failure scenario is a link failure if all traffic destined for a failed node is removed from the ring. (This analysis also assumes that a link failure causes working traffic on both links of the span to undergo protection switching.) FIG. 3 shows an example of the protection bandwidth assignments for a particular demand pattern on a four node ring with 1:1 protection. In this example each connection requires the same bandwidth d and the ring size is given by 3d.

Figure 1A:
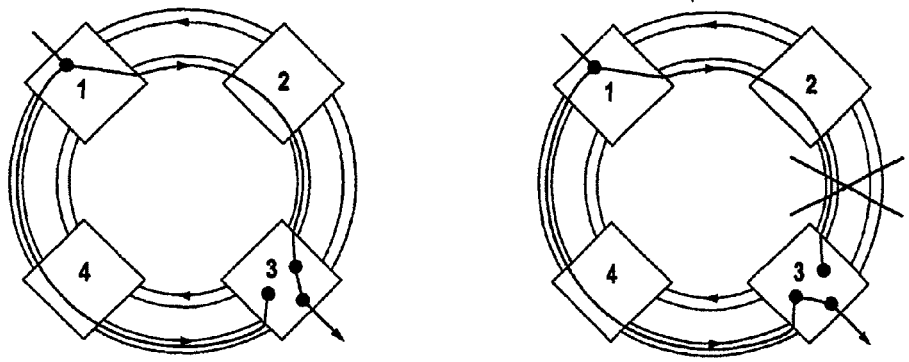
FIG. 1 is an illustration of several different SHR ring network topologies.
Figure 1B:
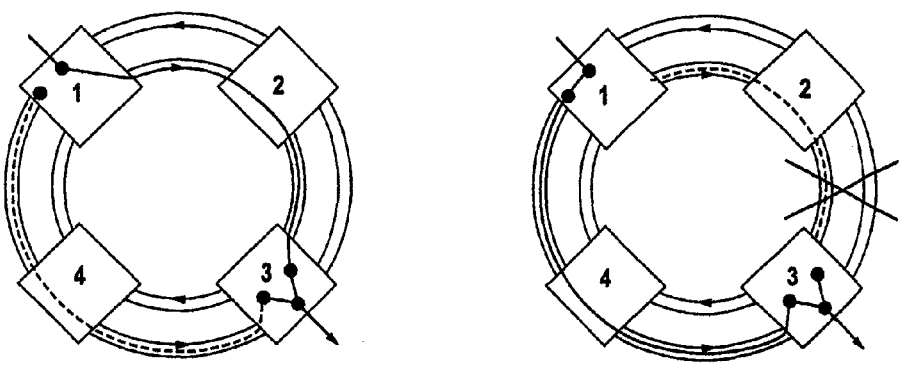
Figure 1C:
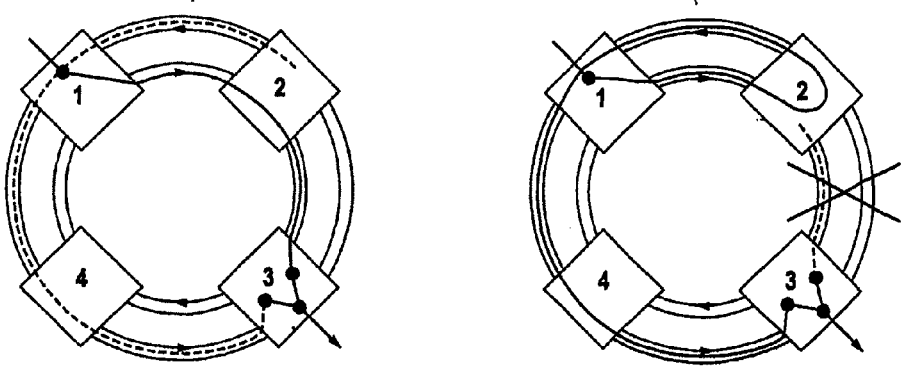

Unlike the 50% method, the required capacity with minimum spare bandwidth may differ for the 1:1 protection methods. Now, the required capacity for 1:1 path switching is always less than or equal to that required by 1:1 line switching and 1+1 path switching. In 1+1 path switching traffic from all protection paths is present on the ring, where in 1:1 path switching, only traffic from the failed link is present. In 1:1 line switching the protection connections loopback from the point of failure to the source node on the opposite ring fiber, and then proceed to the destination node. (See FIG. 1c.) The protection paths for 1:1 path switching do not include the looped back portion of the protection path, resulting in the same or less traffic on each link.

Another observation is that the required capacity for 1:1 path switching on bidirectional rings with minimum spare bandwidth is independent of the routing scheme. The independence results from the fact that after a single location failure, 1:1 path switching produces the same topology regardless of the original routing scheme. The failure location dictates which direction the connection must traverse the ring. Thus, provided that the working paths alone do not yield a higher maximum bandwidth link than the working plus protection paths (as in unidirectional routing), the required capacity for 1:1 path switching is independent of routing.

Expressions for the required capacity in a ring are possible given knowledge of the connections and their associated bandwidth. These expressions are developed below for a 2-fiber ring, although they can be extended to 4-fiber rings by allowing links to accommodate both working and protection traffic. Each span connecting adjacent nodes of a 2-fiber ring has two links, one carrying traffic in the clockwise direction and one in the counter-clockwise direction. Let i and j represent two different spans on a ring, and let C(i, 0) denote the set of working connections and their associated bandwidth traversing span i in the clockwise direction, and let C(i, 1) denote the set of working connections on span i in the counter-clockwise link. After a failure at span j, the working and protection connections on the clockwise link of span i, $C_{wp}(i, j, 0)$ is represented by the equation:

$$C_{wp}(i,j,0) = C(i,0) + C(j,1) - (C(i,0) \cap C(j,0)) - (C(i,1) \cap C(j,1)) \quad (2)$$

where $C(i, 0) \cap C(j, 0)$ represents the working connections removed from the clockwise link on span i by the failure and $C(i, 1) \cap C(j, 1)$ represents connections on the counter-clockwise link of span j which are not rerouted across the clockwise span i link. Likewise, the working and protection connections on the counter-clockwise link of span i after a failure at span j is given by:

$$C_{wp}(i,j,1) = C(i,1) + C(j,0) - (C(i,1) \cap C(j,1)) - (C(i,0) \cap C(j,0))$$

The required capacity for asymmetric connections is given by the maximum of equations (2) and (3) for all i, j. If the connections are symmetric, equations (2) and (3) are equal, and the required capacity is given by maximizing equation (2).

The connection topology of 1:1 line switching after a failure is given by the connections of 1:1 path switching plus the looped back portions of the protection connections. Looping back may result in less elements in the $C(i, 0) \cap C(j, 0)$ and $C(i, 1) \cap C(j, 1)$ sets of equations (2) and (3) depending on whether the failure is upstream or downstream of i for a particular connection. Thus, 1:1 line switching requires the same or more ring capacity than 1:1 path switching. Moreover, the ring capacity for 1:1 line switching is dependent upon the routing method. The routing method determines the length of the looped back segments of the protection connections.

The independence with respect to routing inherent in 1:1 path switching means that only knowledge of the total demand between node pairs, not knowledge of the individual connection paths, is needed. Thus, if D(i, j, 0) and D(i, j, 1) represent the set of demand present on link i in the clockwise and counter clockwise direction, respectively, given a failure on link j; the ring capacity is given by the maximum of D(i, j, 0) and D(i, j, 1) for all i and j. As is shown below, a connection admission control or a dynamic bandwidth allocation method can use this process for a 1:1 path switching ring.

Exemplary simulations and analysis results for the required capacity of various protection schemes with the fixed and minimum spare bandwidth allocation were executed by the present inventors. The exact logical topology of the demand pattern on the ring is application dependent; however, two common topologies are the centralized and the fully distributed, or mesh, demand pattern. In the centralized demand pattern all ring nodes are connected to a central, or hub, node only. No direct connections exist between non-hub nodes. The fully distributed topology supports connections between every node pair on the ring. In addition, duplex connections may be symmetric or asymmetric. The analysis assumes that all demand between node pairs is carried along the same path (no demand splitting).

The required capacity is easily analyzed for centralized and mesh demand patterns when the demand between connected node pairs is equal and symmetric. Equal symmetric demand is common in WDM optical rings. As mentioned above, all three protection schemes on unidirectional rings yield a required capacity for symmetric connections given by the sum of all the oneway demand on the ring. Thus, if the demand between connected node pairs is d, the ring capacity for a centralized demand is given by RC=(n−1)d For a mesh demand, the capacity is RC=(n(n−1)d)/2. This demand is present on all links for 1+1 path switching, but on only the working fiber for the 1:1 methods.

The required capacity of the 1:1 methods for equal symmetric demand on bidirectional rings is dependent on the spare bandwidth allocation. For the 50% method, shortest path routing gives the minimum maximum bandwidth link for the centralized and mesh demand patterns with equal symmetric connections. The ring capacity for both 1:1 path and 1:1 line switching with 50% spare bandwidth and a centralized demand pattern is given by:

$$RC = \begin{cases} (n-1)d & \text{odd } n \\ nd & \text{even } n \end{cases} \quad (4)$$

Note that this RC is larger than on a unidirectional ring for even n. Thus, for equal symmetric centralized demand, the protection scheme yielding the minimum required capacity is a function of the routing method.

With a mesh demand topology, 1:1 protection with bidirectional routing makes more efficient use of ring bandwidth than 1+1 path protection. For odd n, each link contains $(n^2−1)/8$ working connections with shortest path routing. When n is even, the maximum number of working connections on a link is given by $[n^2/8]+1$, where $[X]$ is the largest integer $\leq X$. Thus, the ring capacity for the 50% method is:

$$RC = \begin{cases} \dfrac{(n^2-1)d}{4} & \text{odd } n \\ \left(\left[\dfrac{n^2}{8}\right]+1\right) \times 2d & \text{even } n \end{cases} \quad (5)$$

As n increases, this required capacity approaches only half the amount needed for 1+1 path switching. Note that with the 50% method, the required capacity for 1:1 path switching and 1:1 line switching is the same.

For minimum spare bandwidth allocation, the ring capacity is given by the link with the maximum working and protection bandwidth after any failure or non-failure scenario. The required capacity for bidirectional rings with even n and equal symmetric demand decreases under this spare capacity allocation. For example, in a equal symmetric centralized demand pattern, 1:1 protection yields a ring capacity of RC=(n−1)d when n is even. (See FIG. 3.) Similarly, a mesh demand pattern has a ring capacity of $$RC = \begin{cases} \dfrac{(n^2-1)d}{4} & \text{if } n \text{ is odd} \\ \dfrac{n^2 d}{4} & \text{if } n \text{ is even} \end{cases}$$

The reduction in ring size is most pronounced for n=4 (67%). Both 1:1 path switching and 1:1 line switching yield the same ring capacity for shortest path routing. In 1:1 line switching with shortest path routing, the looped back sections of the protection paths lie within n/2 nodes of the failed span. Although 1:1 path switching has a capacity advantage over 1:1 line switching on this portion of the ring, the difference does not affect the required capacity.

Random symmetric demand exists when the connections between node pairs are symmetric, but the demand between different node pairs varies. This traffic pattern exists on currently deployed SONET rings. As mentioned above, all protection methods on unidirectional rings have the same capacity for random symmetric demand. Differences in required capacity exist, however, for bidirectional rings. The ring capacity for bidirectional rings with 50% spare bandwidth is the same for both 1:1 path and 1:1 line switching, but differs from 1+1 path switching. Analysis on bidirectional rings is more difficult with these traffic patterns, so the average bandwidth advantage of minimum spare capacity may be examined through simulations.

For simplicity, the simulations create one connection between node pairs in a given topology, and this connection defines the total node-pair demand. The connections are assigned bandwidth randomly with a uniform distribution. Two different bidirectional routing schemes are used for the working traffic. One routing method is shortest path routing (SP) where the connection is established in the direction containing the least hops. Shortest path routing completely determines the direction of the connections when n is odd. When n is even, the direction chosen for connections which traverse n/2 nodes alternates for adjacent n/2 length connections. This method assumes a prior knowledge of all connections on the ring. The method first routes all connections according to the shortest path. Then, the longest path for each connection is tested, in an iterative fashion, to see if the maximum working bandwidth link is reduced. The direction for the connection yielding the minimum maximum bandwidth link is chosen. This iteration is repeated for all connections. This method is guaranteed to yield the same or less bandwidth for the maximum bandwidth link when compared to the shortest path method. Routing methods attempting to minimize the maximum bandwidth link on a first come, first serve basis, without a prior knowledge of all connections, are not considered for these simulations because, on average, they yield a larger maximum bandwidth link than shortest path routing.

Figure 4:
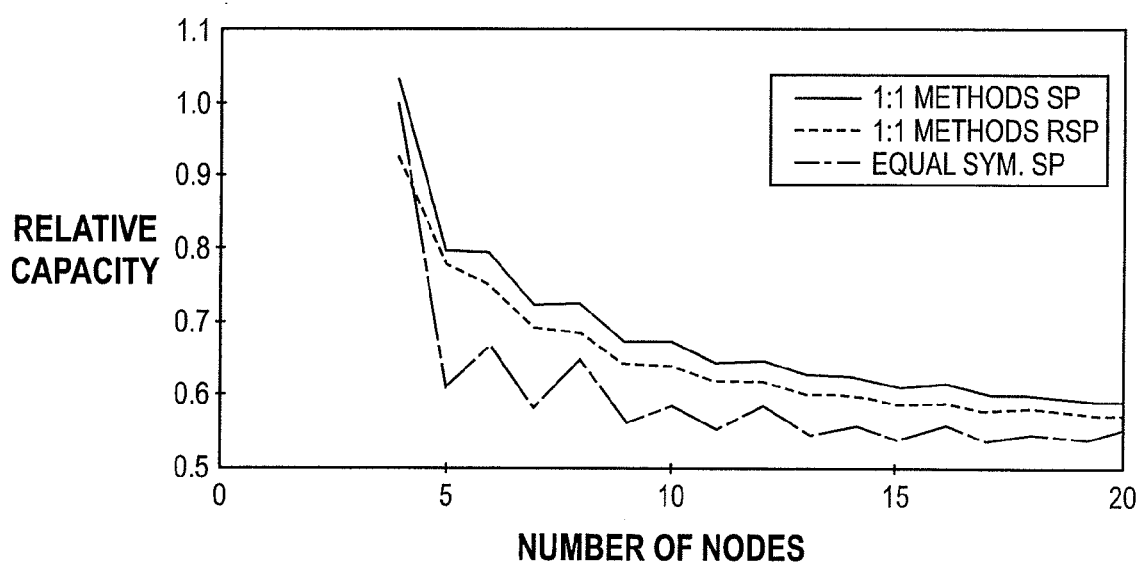
FIGS. 4-11 are graphs comparing the required capacity for various SHR protection methods.

The mesh topology is discussed first. The demand between node pairs is symmetric but randomly chosen with a uniform distribution for each node pair. For comparison, the required capacity for the 1:1 methods divided by the required capacity for 1+1 path switching is used as a relative capacity measure. FIG. 4 illustrates the average relative capacity with random symmetric demand and 50% spare capacity allocation. Also shown in the figure is the relative required capacity under equal symmetric demand: that is, equation (5) with d equal to the average demand bandwidth. On average, the 1:1 methods with random symmetric demand require less bandwidth than 1+1 path switching in a mesh topology. The only exception was for the SP method with n=4. The RSP routing method reduced the required capacity over the SP routing method by an average of 4%. However, the bandwidth advantage of the 1:1 protection methods over 1+1 path switching for random symmetric demand is not as great as for equal symmetric demand. The variance of the working bandwidth on individual links is greater than the variance of the total demand, thereby decreasing the average difference between the total bandwidth and the maximum bandwidth link.

Figure 5:
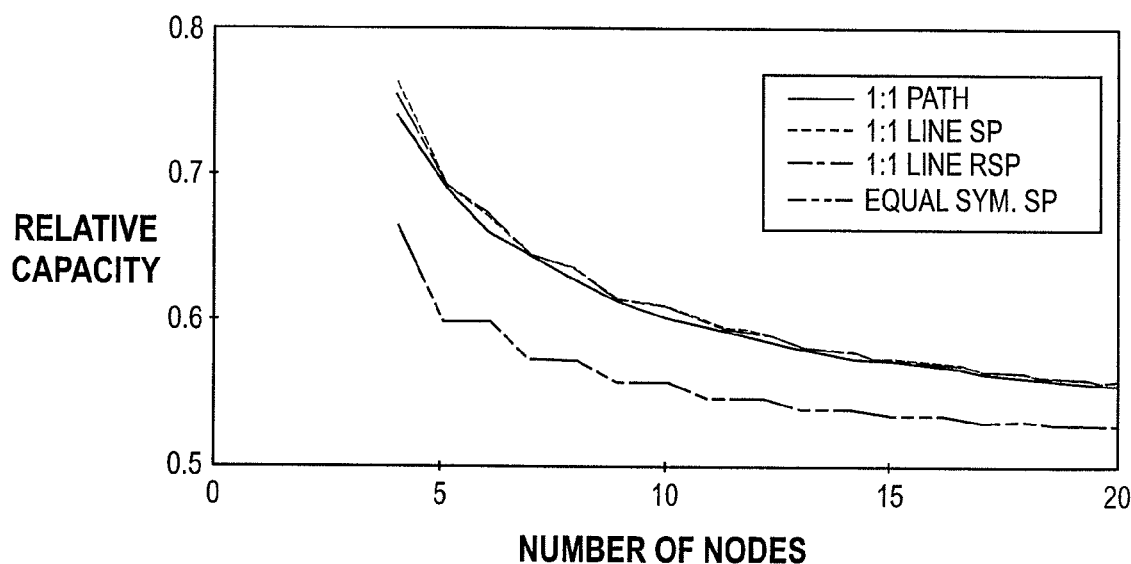

The average relative capacity with minimum spare bandwidth in a random symmetric mesh topology is shown in FIG. 5. Also shown is equation (6) with d equal to the average demand bandwidth. As expected, the 1:1 path switching method requires less capacity than the 1:1 line switching method, although the difference is slight. The SP routing method requires less capacity for 1:1 line switching than the RSP method. This is not surprising since some of the demand in the RSP traverses the longest path. This in turn increases the length of the loopback section of the line switched protection path, causing the connection to be present on more links.

Figure 6:
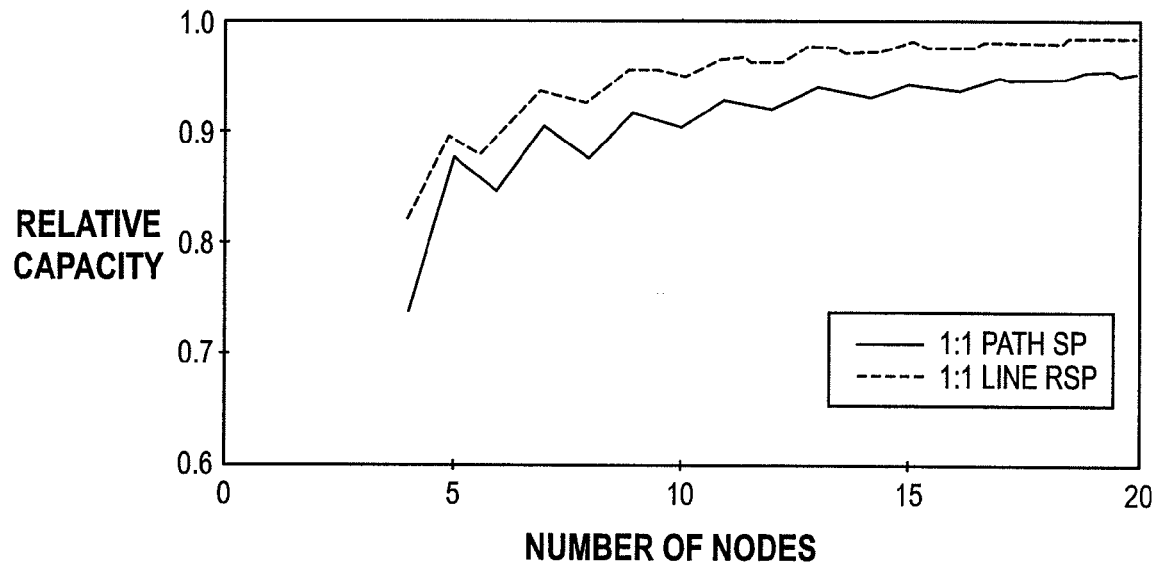

To understand the advantage of minimum spare bandwidth over fixed 50% reservation, the required capacities yielded for FIG. 4 are compared to those shown in FIG. 5. FIG. 6 demonstrates the percentage of required capacity needed with minimum spare bandwidth allocation and random symmetric mesh demand compared to the 50% method. The bandwidth advantage is greatest for small n. When n=4, the minimum spare bandwidth assignment for 1:1 path switching and SP routing requires only 73% of the capacity necessitated by the 50% method. This bandwidth advantage diminishes for increasing n. As n increases the link bandwidth variance decreases, causing the minimum spare bandwidth method to require close to 50% spare bandwidth for each link. The difference with the RSP routing method is less due to the reduced ring capacity in the 50% method. (1:1 path switching with minimum spare bandwidth is unaffected by the routing method.)

Figure 7:
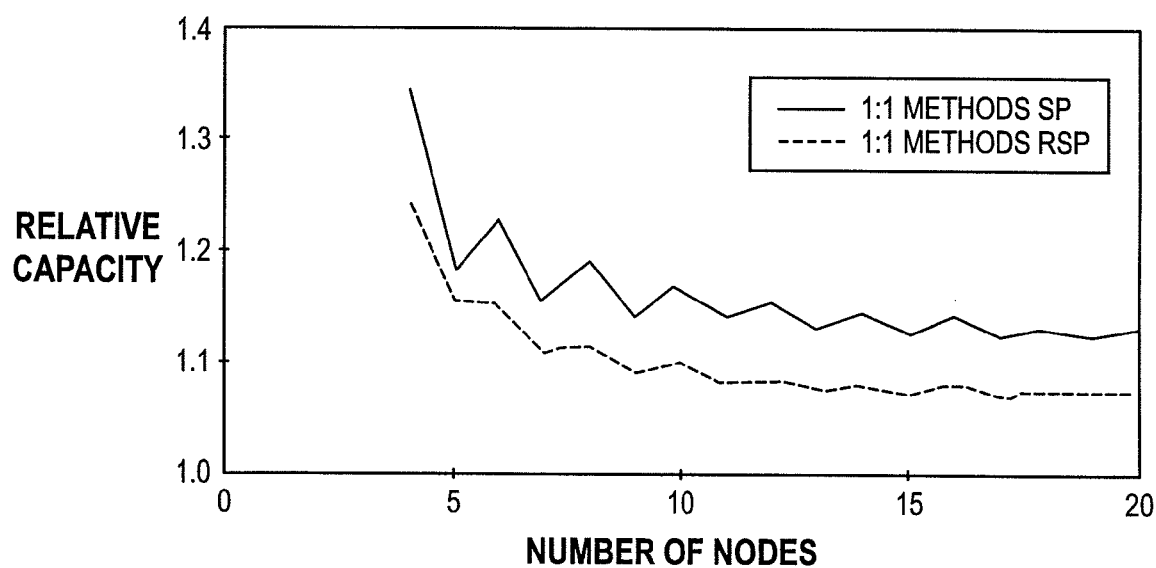

FIG. 7 illustrates the average relative capacity with random symmetric centralized demand and 50% spare bandwidth. The 1:1 protection methods require a larger ring size for the same node pair demand pattern. Consistent with equation (4), the difference is most pronounced for small n and for even n. At n=4, 1:1 protection with SP routing requires 34% more capacity than 1+1 protection. This tapered off to 10% more capacity for n=20. RSP routing reduced the relative capacity by an average of 8%. A small n results in a greater variance in link bandwidth which yields a larger average maximum bandwidth link relative to the total bandwidth.

The required capacity of 1:1 path switching with minimum spare bandwidth, resulting from maximizing equations (2) and (3) is simplified for centralized demand. A failure scenario with 1:1 path switching causes each link to contain only one type of traffic: namely, connections with the hub node as the source, C(from hub), or with the hub node as the destination, C(to hub). If SP routing is used, the same is true for a non-failure scenario. The required capacity for 1:1 path protection and centralized demand is:

$$RC = \max\{C(\text{to hub}), C(\text{from hub})\} \quad (7)$$

For symmetric connections, however, C(to hub)=C(from hub) 1:1 line switching with bidirectional routing cannot guarantee the segregation of traffic on each link according to the direction of flow in relation to the hub node. This results from the loopback portions of the protection paths during failure. With shortest path routing, however, the links containing a mix of "to hub" and "from hub" traffic do not contain more connections than links adjacent to the hub node. The symmetric nature of the connections will thus cause these "mixed" links to contain equal or less bandwidth than the links adjacent to the hub node. Thus, like 1:1 path switching, the ring capacity is given by the sum of all one-way demand on the ring. Therefore, 1+1 path protection and the 1:1 protection methods on bidirectional rings with minimum spare bandwidth and 1+1 path protection yield the same required capacity for symmetric centralized demand. Thus, the bandwidth advantage of minimum spare capacity is given by the inverse of the plots in FIG. 7.

Figure 2:
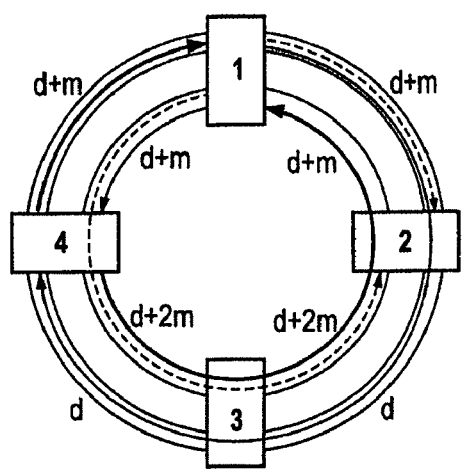
FIG. 2 illustrates asymmetric connections on a 1+1 path switched ring.
Figure 8:
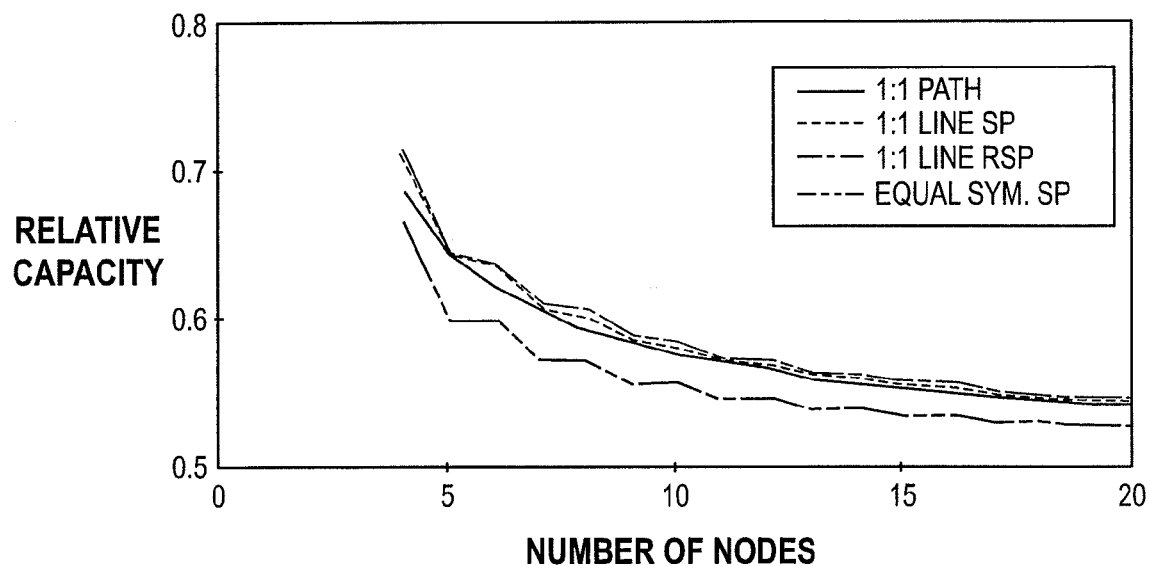

Random asymmetric demand occurs when the simplex demand between node pairs is allowed to vary. This traffic pattern is likely to exist in future connection oriented rings with ATM layer protection schemes or with asymmetric SONET connections. The mesh topology is discussed first. The average relative required capacity for random asymmetric mesh demand with shortest path routing is shown in FIG. 8. Also shown in this figure is equation (6) with the d set to the average simplex demand. The ability to reuse protection bandwidth inherent in 1:1 protection on bidirectional rings gives a capacity advantage over 1+1 path switching. Note from FIG. 8 that 1:1 line switching requires a slightly larger ring size than 1:1 path switching for shortest path routing. Again, the shorter loopback sections created in shortest path routing produced a slight capacity advantage over the RSP method. FIG. 8 shows that the relative ring size required by 1:1 path switching with minimum spare bandwidth and random asymmetric demand is more than the equal symmetric demand case. However, comparing FIG. 8 with FIG. 5 shows that the 1:1 protection with asymmetric demand gives a greater reduction in required capacity from 1+1 path switching than for symmetric demand. The reduction is caused by the increase in capacity found in 1+1 path switched rings with asymmetric traffic as shown in FIG. 2.

Figure 9:
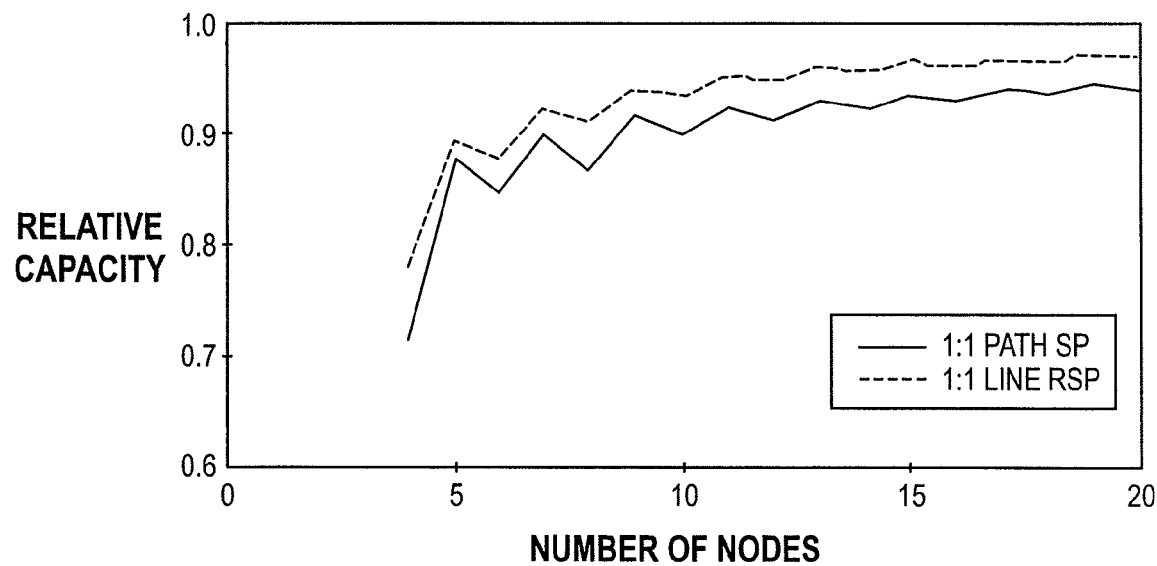

To understand the advantage of minimum spare bandwidth, the ring sizes yielded for FIG. 8 are compared to those given by the 50% method. FIG. 9 demonstrates this difference for 1:1 path switching and random asymmetric mesh demand. The bandwidth advantage for both routing schemes is greatest for small n. When n=4, the minimum spare capacity assignment for 1:1 path switching requires 73% of the required capacity necessitated by the 50% method. This bandwidth advantage diminishes for increasing n because of the reduced variance in link bandwidth. The advantage for 1:1 line switching is similar, although slightly less.

Figure 10:
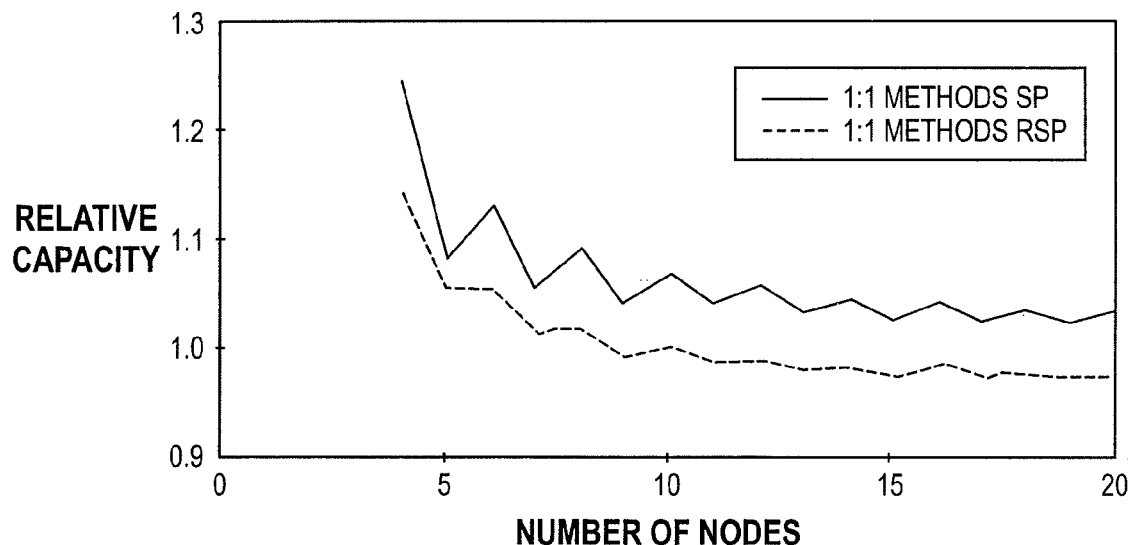
Figure 11:
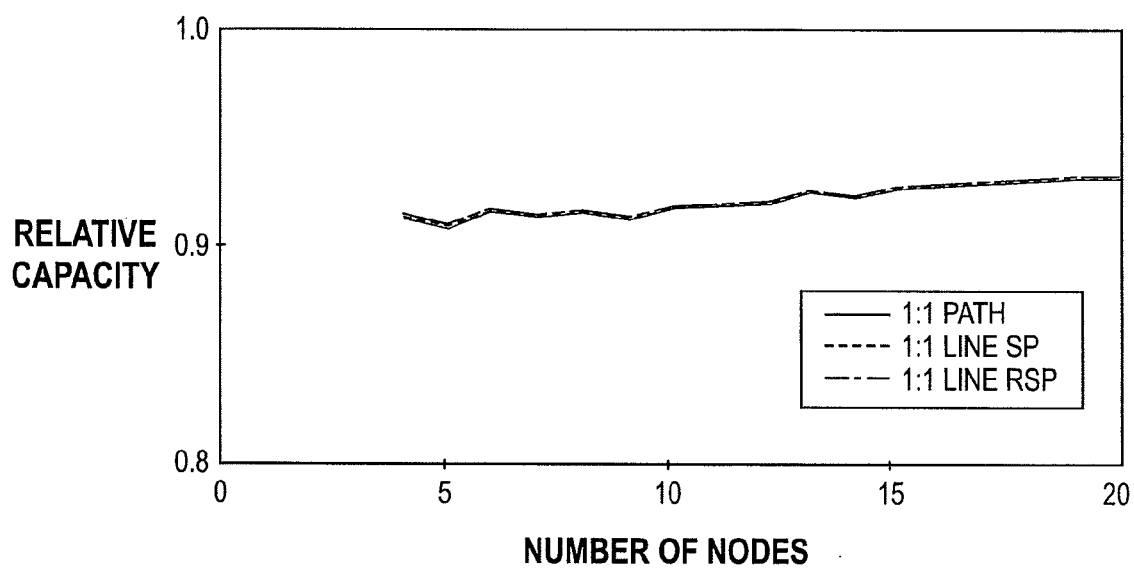

FIG. 10 and FIG. 11 illustrate simulation results for random asymmetric centralized demand. FIG. 10 compares the average required capacity of the 1:1 protection with 50% spare bandwidth to 1+1 path switching. This figure shows that 1:1 protection with shortest path routing requires a larger ring size that 1+1 path switching. As expected, the difference is less for asymmetric demand than for symmetric demand. (See FIG. 7.) A result is that the RSP routing method produces a smaller average required capacity for 1:1 protection than for 1+1 path switching for n>10.

FIG. 11 gives the same comparison as FIG. 10, but for minimum spare bandwidth allocation. It is noted that minimum spare bandwidth causes the 1:1 protection methods to require less capacity than 1+1 path switching for any n, with the decrease most pronounced for small n. For n=5, 1:1 path switching requires an average of 91% of the bandwidth needed by 1+1 path switching. In unidirectional routing, links adjacent to the hub node contain only one kind of traffic, but other links may contain a mix of to hub and from hub traffic. Thus, 1:1 path switching should require less capacity than 1+1 path switching for random asymmetric centralized demand. Likewise, 1:1 line switching cannot guarantee the segregation of traffic on each link according to the direction of flow in relation to the hub node. Unlike symmetric demand, however, asymmetric demand can cause these "mixed" links to contain more traffic than the total "to hub" or "from hub" traffic. Thus, it is possible for these mixed links to cause the required capacity of 1:1 line switching to be greater than 1:1 path switching. This difference is seen in FIG. 11 as well.

In summary of the relative required capacity for the three protection schemes, it has been found that the difference in capacity between these protection methods is dependent upon the routing method, the demand pattern and the spare bandwidth allocation. For a unidirectional ring, all protection methods perform the same for symmetric duplex demand. Asymmetric connections adversely affect 1+1 path switching when compared to 1:1 protection, causing the 1:1 protection methods on unidirectional rings to yield a smaller required capacity. For bidirectional rings with 50% spare bandwidth, the protection scheme yielding the minimum ring capacity is a function of the demand pattern. For random symmetric centralized demand, the 1:1 methods require more capacity than 1+1 path switching. For random asymmetric centralized demand, 1:1 protection methods sometimes require less capacity than 1+1 path switching. The relative capacity depends on the routing method and the number of nodes in the ring. For a random mesh demand pattern, the 1:1 methods require less capacity that 1+1 path switching. The difference is most pronounced for asymmetric demand.

When minimum spare bandwidth is used on bidirectional rings, 1:1 path protection requires the same or less capacity than the other methods for all demand patterns. The foregoing analysis and simulations show that, in comparison to the 50% method, minimum spare bandwidth decreases the required capacity for both a centralized and a mesh demand pattern with either symmetric or asymmetric connections. For random symmetric centralized demand, the 1:1 protection methods perform the same as 1+1 path switching. For random asymmetric centralized demand, the 1:1 protection methods use approximately 92% of the capacity needed by 1+1 path switching. Moreover, 1:1 path switching uses slightly less capacity than 1:1 line switching and is independent of the routing method. For a random symmetric or asymmetric mesh demand, minimum spare bandwidth makes 1:1 path switching the most bandwidth efficient method. 1:1 line switching with shortest path routing follows closely. In some cases, the minimum spare bandwidth allocation reduces the required capacity by 30% over the 50% method.

In view if the foregoing, a connection admission control (CAC) method for 1:1 path switching with minimum spare bandwidth in a bidirectional ring has been developed. The CAC method for the 50% method need only examine the working bandwidth on each link. The CAC method for minimum spare bandwidth, however, should account for the working and protection traffic present on a link after any single location failure. The analysis presented above is implemented in the newly developed CAC using required capacity states for each link. Because a duplex connection may contain an asymmetric bandwidth assignment, the CAC method is assumed to examine each simplex part of the duplex connection separately. The CAC method disclosed herein determines if enough bandwidth exists to support a simplex connection. The decision to admit a duplex connection involves to outcome of both simplex paths.

A new simplex connection may traverse one of two paths depending on the failure location. (See figure FIG. 1b.) Together, these two paths cover all n spans in the ring, although only one link is used on each span. (One path uses the inner ring, while the other path uses the outer ring.) Of these two paths one path is the working path, i.e, this path is active in a non-failure scenario. Let R(i, j) represent the required capacity needed on a link of span i given a failure at span j. Since there are a total of n spans, n state variables exist for each link. The R(i, i) state is not needed because no traffic exists on a failed link; however, a state is needed to represent a non-failure condition. Let R(i, i) define the working traffic on a link of span i. These definitions are used in the update of the R(i, j) states:

S The set of spans on a ring.
P(c) The set of spans traversed by connection c.
P(c)-bar The set of spans not traversed by connection c.
b(c) The bandwidth associated with connection c.
L Total bandwidth on link.

For each link in the two possible paths of a simplex connection, the states are updated according, to the following equation:

$$R(i,i)=R(i,i)+b(c) \text{ for } c=\text{working connection } R(i,j)=R(i,j)+b(c) \text{ for } \{i \in P(c), j \in \overline{P(c)}\} \quad (8)$$

That is, the connection bandwidth is added to the non-failure state if it is a working connection, and it is added to the states representing failures on spans traversed by the opposite path. A failure on any of the P(c) spans will remove connection c from the link; thus, these states are not updated. A connection is accepted if, after the update in equation (8), $$R(i,j)<L \text{ for all } i,j \quad (9)$$

A connection is rejected if this condition is not met. Likewise, when a connection is removed from the ring, the capacity states for the appropriate links are updated according to equation (10):

$$R(i,i)=R(i,i)-b(c) \text{ for } c=\text{working connection } R(i,j)=R(i,j)-b(c) \text{ for } \{i \in P(c), j \in \overline{P(c)}\} \quad (10)$$

If it is desired to allow 1:1 path protection to be non-revertible, the R(i, i) state is updated after a failure by setting R(i, i)=R(i, j) for a failure at j.

The CAC method for minimum spare bandwidth can be implemented in a centralized or distributed fashion at the systems, such as add drop multiplexers (ADMs), disposed at the ring nodes. Each node should have knowledge of all spans traversed by a simplex connection. To this end, the CAC can be implemented in a distributive manner if this information is included in a call set-up message, either by including a list of these spans in the message or by including the source and destination node and having each node calculate the traversed spans.

There are n total links traversed by the two paths. The working path contains n state updates (addition or subtraction), and the protection path contains n−1 state updates. Thus, the number of state updates is on the order of W. In addition, the total number of capacity states is n for each link or $n^2$ for the whole network.

The foregoing principles for point-to-point connections can be extended to other types of ring networks and other types of communication connections. As a further example point-to-multipoint connections are illustrated. For point-to-multipoint connections, data from one source node is sent to multiple destination nodes. These connections save bandwidth over separate point-to-point connections.

For the sake of bandwidth efficiency, point-to-multipoint connections are "split" onto both fibers such that the source node connects to some destination nodes along one fiber while reaching other nodes on the opposite fiber. For these split connections, the source node dual-feeds traffic along both fibers. The destination nodes upstream from the final destination node on a particular path employ a drop and continue function. A point-to-multipoint connection beginning at source node S, and broadcasting to all other nodes, is shown by the solid lines in FIG. 12a.

The protection paths for the point-to-multipoint connection are shown by the dashed lines in FIG. 12a. The protection paths extend from the last destination node on the working path to the destination node prior to the source node. The dots in this figure indicate drop points on the paths. If nodes adjacent to a failure do not send and/or receive traffic across the failed section, protection switching is accomplished by one node. For a failure on one path of the dual-fed path, the last destination node on the opposite path switches to the protection path. This protection switch results in the "extending" of the path to the failure location as shown in FIG. 12b.

Thus, if both links of a span are considered failed, both parts of the split paths beyond the failure (one working, one protection) are removed. Note that if the demand is not split onto both fibers, the source node accomplishes protection switching by turning on the dual-feed function. As can be seen in FIG. 12b, after the link failure only a portion of the traffic was rerouted by extending from the last destination node via the protection path. As can be seen by this example a reserve capacity of less than 50% is often adequate.

By way of further example, a preferred embodiment of the connection admission control (CAC) method extended to point-to-multipoint connections is illustrated below.

Specifically, for multipoint traffic, shortest path routing puts the working path on both the clockwise and counter-clockwise rings. Denote $w_d(c)$ as the set of links forming the working path on the d direction ring, and $w_d*(c)$ as the working path on the other ring. Similarly, let $p_d(c)$ be the part of the protection path on the d direction ring, and let $p_d*(c)$ be the other part of the protection path on the other ring.

Also, let $w_d(c,i_d)$ be the contiguous set of links starting from the source up to $i_d$, inclusively, traversing in the d direction. The connection admission control method comprises the following analysis:

Step 1: If any of the following two conditions are true:
1) $i_d \in w_d(c)$ and $j \cap w_d(c,i_d) = \emptyset$
   ($i_d$ is part of the working path, and a failure at j does not affect the working path)
2) $i_d \in p_d(c)$ and $j \cap \{w_d*(c,i_d*) - i_d*\} \neq \emptyset$
   ($i_d$ is part of the protection path, and $i_d$ will be used by c if j fails.)
then
   $R'(i_d,j) = R(i_d,j) + b(c)$
Otherwise,
   $R'(i_d,j) = R(i_d,j)$ Step 2: If $R'(i_d, j)$ is less than the ring capacity for all $i_d$ and j, then admit c, and update $R'(i_d,j) \rightarrow R(i_d,j)$.

To update $R(i_d,j)$ when a call terminates, let $R(i_d,j) \leftarrow R(i_d,j) - b(c)$ for all $R(i_d,j)$ satisfying the conditions in step 1.

The connection admission control method ensures enough capacity to handle all admitted traffic under any single location failure scenario.

The connection admission control method described for point-to-multipoint traffic is simple in complexity. Furthermore the connection admission control method can be readily implemented using a state table, which is updated to represent the required bandwidth under all failure scenarios. The simplicity makes minimum spare bandwidth an effective bandwidth allocation method for producing an efficient self-healing ring.

Numerous modifications may be made to the foregoing system without departing from the basic teachings thereof. Although the present invention has been described in substantial detail with reference to one or more specific embodiments, those of skill in the art will recognize that changes may be made thereto without departing from the scope and spirit of the invention.

The invention claimed is:

1. A connection control method for a ring-type communication system, the method comprising:
   evaluating bandwidth required in a ring-type communication system having preexisting working traffic for a proposed connection to the system in addition to the preexisting working traffic;
   evaluating bandwidth required for the preexisting working and protection traffic on the system in at least one failure situation;
   accepting the proposed connection to the system only in the presence of adequate excess bandwidth capacity to support that connection in the at least one failure situation and wherein the evaluation of the bandwidth for the preexisting working and protection traffic further comprises iteratively testing each connection according to shortest and longest paths and choosing the path yielding a reduced working bandwidth.

2. A method as in claim 1 which includes adjusting bandwidth requirements of the system when a connection is dropped.

3. A method as in claim 2 which includes conducting the evaluating on a distributed basis.

4. A ring-type communication system comprising:
   a working path having preexisting working traffic and a protection path;
   at least one node coupled to the paths;
   apparatus for accepting a proposed connection to the ring-type communication system in addition to the preexisting working traffic only in the presence of adequate excess bandwidth notwithstanding at least one failure on one of the paths, wherein the apparatus for accepting the proposed connection determines the presence of adequate excess bandwidth by evaluating a bandwidth for the preexisting working and protection traffic by simulating the routing of all connections according to a shortest path and then a longest path and choosing a path yielding a relatively minimum value of maximum bandwidth link.

5. A system as in claim 4 where the apparatus comprises, at least in part, an add drop multiplexer at the at least one node.

6. A system as in claim 4 which includes a plurality of nodes each of which contains an add drop multiplexer where the apparatus is distributed there among.

7. A device for a communication system comprising:
   at least a first pair of ports for ingress and egress of communications signals from respective links in the system;
   add drop processing structures coupled to the ports for adding and dropping communications associated with the links; and
   a connection admission control coupled to the structures which, at least in part, evaluates bandwidth requirements for each link based upon preexisting working traffic on the link, additional bandwidth requirements, if a requested connection to the communication system is accepted and if a link fails, and accepts the requested connection, only if sufficient bandwidth is available for each link, wherein the connection admission control evaluates the bandwidth requirements for the preexisting working traffic by simulating the routing of all connections according to a shortest path and then a longest path and choosing a path of the shortest and longest yielding a relatively minimum value of maximum bandwidth link.

8. A device as in claim 7 which includes first and second pairs of ports coupled to the processing structures for bi-directional communications.

9. A device as in claim 7 which includes communications related data used by the connection admission control in determining if a requested connection should be accepted.

10. A device as in claim 7 which includes a plurality of displaced processing structures and connection admission controls where at least some of the processing structures include add drop multiplexers.

11. A device as in claim 10 where the displaced processing structures are linked, via ports and communications links, the links at least during selected time intervals carry substantially duplicate communications information routed in opposite directions.

12. A device as in claim 11 were the displaced processing structures each comprise a four port node of an optical communications system.

13. A device as in claim 7 where the processing structures comprise a node of an optical communication system.

* * * * *